(12) United States Patent
Xiao (10) Patent No.: US 11,304,404 B2
(45) Date of Patent: Apr. 19, 2022

(54) PORTABLE BOTTLE FOR PET

(71) Applicant: Leshwo Rocity (Shenzhen) Industrial Co., Ltd, Shenzhen (CN)

(72) Inventor: WeiJun Xiao, Shenzhen (CN)

(73) Assignee: Leshwo Rocity (Shenzhen) Industrial Co., Ltd., Shenzhen (CN)

( * ) Notice: Subject to any disclaimer, the term of this patent is extended or adjusted under 35 U.S.C. 154(b) by 368 days.

(21) Appl. No.: 16/550,269

(22) Filed: Aug. 25, 2019

(65) Prior Publication Data
US 2020/0077622 A1 Mar. 12, 2020

(30) Foreign Application Priority Data
Sep. 10, 2018 (CN) .......................... 201821475743.4

(51) Int. Cl.
| | |
|---|---|
| *A01K 7/00* | (2006.01) |
| *B65D 43/02* | (2006.01) |
| *B65D 23/00* | (2006.01) |
| *B65D 51/28* | (2006.01) |
| *B65D 47/20* | (2006.01) |

(52) U.S. Cl.
CPC ............ *A01K 7/005* (2013.01); *B65D 23/003* (2013.01); *B65D 43/0231* (2013.01); *B65D 47/2012* (2013.01); *B65D 51/28* (2013.01)

(58) Field of Classification Search
CPC .. A01K 7/005; B65D 23/003; B65D 43/0231; B65D 47/2012; B65D 51/28; B65D 23/12; B65D 47/2075; B65D 77/28
USPC .......................................................... 119/74
See application file for complete search history.

(56) References Cited

U.S. PATENT DOCUMENTS

| | | | | |
|---|---|---|---|---|
| 2,728,491 A | * | 12/1955 | Aneshansley | ............ G01N 1/14 |
| | | | | 222/158 |
| 2,754,821 A | * | 7/1956 | Burbig | .................... A61H 35/02 |
| | | | | 604/298 |

(Continued)

FOREIGN PATENT DOCUMENTS

| | | | | |
|---|---|---|---|---|
| GB | 2067517 A | * | 7/1981 | ............ G01F 11/286 |
| GB | 2146973 A | * | 5/1985 | ............ G01F 11/286 |

OTHER PUBLICATIONS

Amazon, Pet Water Bottle for Dogs with Foldable Water Dispenser, 2016 (Year: 2016).*

*Primary Examiner* — John K Fristoe, Jr.
*Assistant Examiner* — Eric C Baldrighi
(74) *Attorney, Agent, or Firm* — Raymond Y. Chan; David and Raymond Patent Firm (57) ABSTRACT

A portable bottle for pet includes a bottle body and a bottle lid. The upper end of the bottle lid has a flexible bowl member which is capable of being selectively unfolded or downfolded, wherein the bottom portion of the bottle lid is connected with the bottle body. The bottle lid comprises a movable blocking arrangement. An upper end of the movable blocking arrangement is connected to the liquid port of the bottom portion of the flexible bowl member and the lower end of the movable blocking arrangement is connected to a supplying pipe in the bottle body. The functions of the portable bottle for pet integrates bottle and bowl, providing a good ability of preventing leaking out, sealing during porting, blocking water during drinking, and enabling water flowing back to the bottle body so as to reduce the waste of water.

19 Claims, 5 Drawing Sheets

(56) References Cited

U.S. PATENT DOCUMENTS

| | | | | |
|---|---|---|---|---|
| 4,474,312 A * | 10/1984 | Donoghue | ............ | G01F 11/286 |
| | | | | 222/205 |
| 5,809,935 A * | 9/1998 | Kolterman | ............... | A01K 7/02 |
| | | | | 119/74 |
| 5,833,124 A * | 11/1998 | Groves | ................. | G01F 11/286 |
| | | | | 222/158 |
| 5,992,702 A * | 11/1999 | Shapiro | .................... | A01K 7/00 |
| | | | | 222/192 |
| 9,713,937 B2 * | 7/2017 | Li | ......................... | B65D 47/20 |
| 10,028,484 B2 * | 7/2018 | Ross | ........................ | A01K 7/00 |
| 10,064,387 B2 * | 9/2018 | Burroughs | ............ | B65D 41/26 |

* cited by examiner

PORTABLE BOTTLE FOR PET

CROSS REFERENCE OF RELATED APPLICATION

This is a non-provisional application that claims the benefit of priority under 35 U.S.C. § 119 to a Chinese application number 201821475743.4, filed Sep. 10, 2018.

BACKGROUND OF THE PRESENT INVENTION

Field of Invention

The present invention relates to a water bottle, and more particularly to a portable water bottle for pet.

Description of Related Arts

With the rapid development of society, living standard of people is improved accordingly. More and more people change from pursuing simple material life to spiritual enjoyment. Raising a pet becomes common in daily life. Sometimes, people go for a walk or play with pets. During walking a pet, it may need to drink water, but most of natural outdoor water sources are not suitable for the pet. In that case, a portable water bottle for storing drinking water for pet is demanded. There is a kind of water bottle for pet with a lid for covering the bottle in the market. The lid of the water bottle has a bowl-shape and an opening for flowing water to a bottom of the lip. Water is flowed into the bowl-shaped lip through squeezing the body of the water bottle. And then, the pet is able to drink the water in the lip. However, the water remained in the bowl-shaped lip which cannot flow back into the water bottle is waste. In addition, the upwardly extending bowl-shaped lip of the conventional water bottle enlarges the overall size of the conventional water bottle for pets, which causes the conventional water bottle with the bowl-shaped lip is inconvenient for carrying.

Therefore, the conventional water bottle for pet which has the above drawbacks needs to be improved.

SUMMARY OF THE PRESENT INVENTION

An object of the present invention is to provide a portable bottle for pet, which overcomes drawbacks of the conventional water bottle for pet.

The present invention provides a portable bottle for pet which comprises a bottle body and a bottle lid. An upper portion of the bottle lid has A silicone made flexible bowl member and a lower portion of the bottle lid is configured to be connected with the bottle body. A middle portion of the bottle lid has a movable blocking arrangement. An end portion of the movable blocking arrangement is connected to a liquid port of a bottom portion of the flexible bowl member and a lower end of the movable blocking arrangement is connected to a supplying pipe in the bottle body. The movable blocking arrangement comprises a nozzle and a rotating switch. An upper end of the nozzle is communicated with a bottom portion of the flexible bowl member, and the rotating switch is located in the upper end of the nozzle. A lower end of the nozzle is connected to a supplying pipe. The lower end of the supplying pipe is located in the bottle body. Furthermore, a top end of the nozzle passes through the bottom portion of the flexible bowl member. A blocking support is provided on the top portion of the nozzle. The rotating switch is provided on the blocking support. A side of the upper end of the nozzle is provided with a plurality of water outlets. The water outlets are communicated with the water supplying pipe.

Furthermore, a bottom portion of the rotating switch comprises a plurality of plugs corresponding to the water outlets of the nozzle. The plugs are installed in the water outlets of the nozzle respectively.

Furthermore, a side of the liquid port of the bottom portion of the flexible bowl member, corresponding to the water outlets of the nozzle, is provided to one or more step seals. By turning the rotating switch to align all outlets of the nozzle with the one or more step seals, the liquid is sealed inside of the bottle body.

Furthermore, the movable blocking arrangement comprises a circular seal which is set between the flexible bowl member and the nozzle. The nozzle has a mounting groove matched with the circular seal. The mounting groove is proved under the water outlet of the nozzle. The circular seal is installed in the mounting groove.

Further, the bottle body is made of flexible plastic or silicone.

From the above, the advantages of the portable bottle for pet provided by the present invention are as follows:

1. One advantage of the present invention is that the portable bottle for pet is a good in preventing liquid leaking out and liquid sealing, wherein the one or more outlets of the nozzle are aligned with the one or more step seals respectively through turning the rotating switch, and the liquid in the bottle body is sealed therein so as to prevent leaking out during porting.

2. Another advantage of the present invention is that the bottle lid of the portable bottle for pet has a good liquid blocking ability, wherein the rotating switch moves down because of the gravity of liquid so that the plug blocks up the outlets of the nozzle so as to block the liquid, preventing liquid in the flexible bowl member infiltrating into the bottle body.

3. Another advantage of the present invention is that the portable bottle for pet has a good liquid back flowing ability, wherein remaining liquid in the flexible bowl member is able to flow back in the supplying pipe through the outlets of the nozzle under air pressure so as to achieve the liquid back flowing back ability and reduce waste of liquid.

4. Another advantage of the present invention is that the function of the portable bottle for pet integrates bottle and bowl. The flexible bowl member of the bottle lid can be upfolded to form a bowl shape liquid container for containing liquid and downfolded to form a decorative cover covering the bottle body of the portable bottle for pet, ensuring the portable bottle for pet having a compact size for ease of carrying and storing conveniently.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
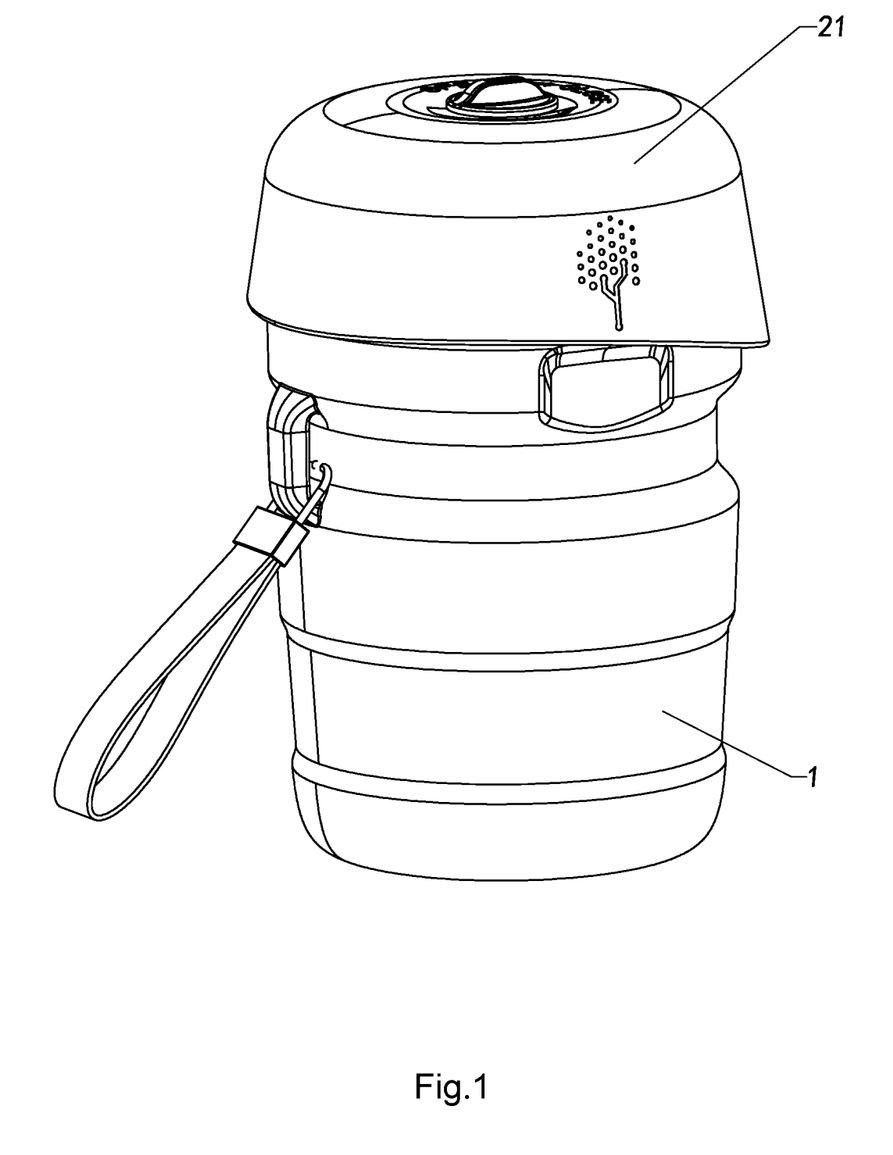
FIG. 1 is a perspective view of a potable bottle for pet according to a preferred embodiment of the present invention, illustrating the flexible bowl member in decorative cover form.
Figure 2:
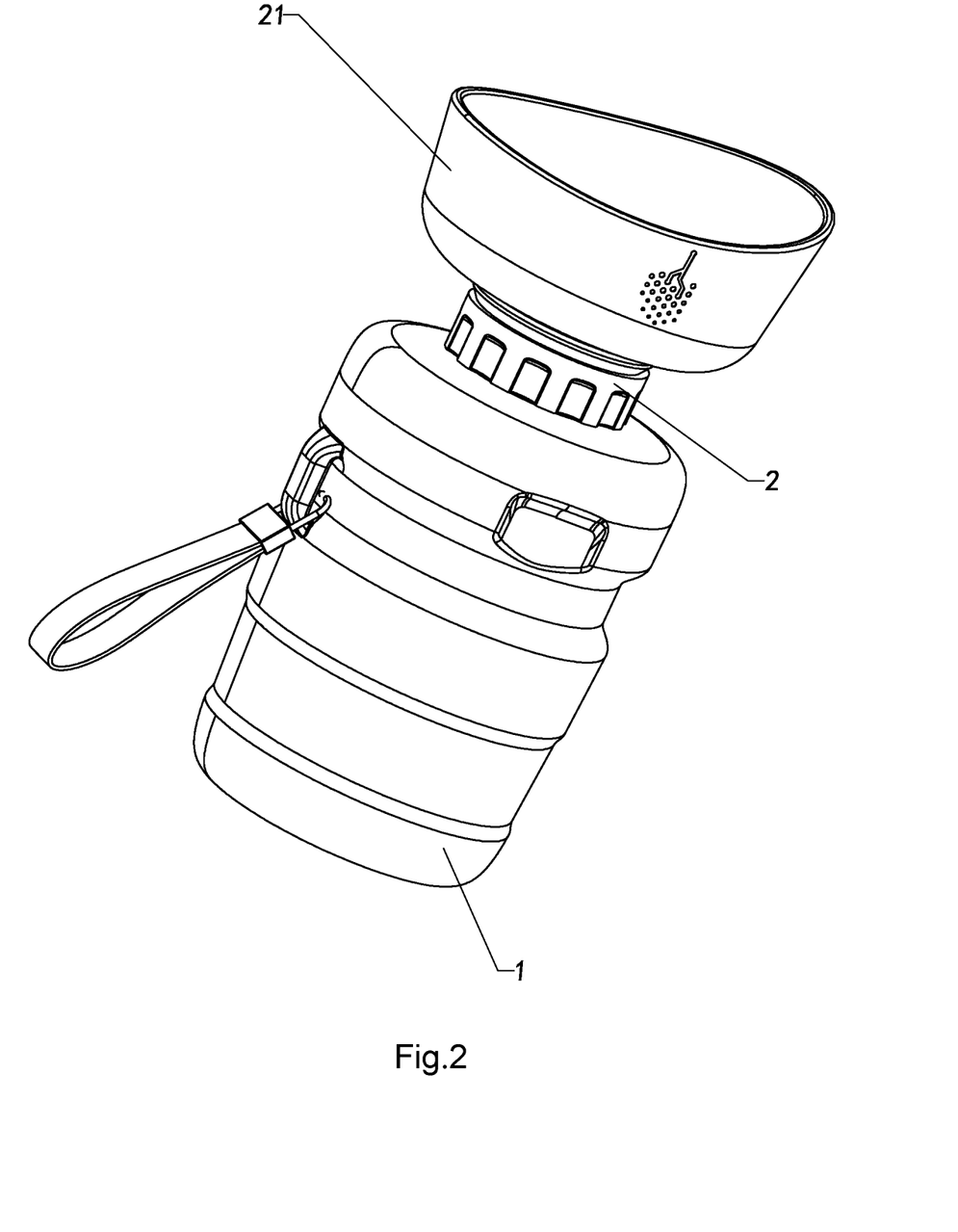
FIG. 2 is a perspective view of the portable bottle for pet according to the above preferred embodiment, illustrating an alternative bowl shape liquid container form of the flexible bowl member.

Referring to FIGS. 1 to 4 of the drawings, a portable bottle for pet according to a preferred embodiment of the present invention is illustrated. The portable bottle for pet comprises a bottle body 1 for containing liquid such as water and a bottle lid 2 detachably connected to the bottle body 1. The bottle lid 2 comprises a flexible bowl member 21, which is made of flexible plastic or silicone and provided at an upper portion of the bottle lid 2 and is capable of being upfolded to form a liquid container or downfolded to form a decorative cover. A lower end of the bottle lid 2 is configured to be connected to the bottle body 1, such as screwing through screw threads. The bottle lid 2 comprises a movable blocking arrangement 22, which is installed in the middle of the bottle lid 2. An upper end of the movable blocking arrangement 22 is connected with a liquid port 212 of the bottom portion of the flexible bowl member 21. The bottle body 1 comprises a supplying pipe 11 extending from an interior of the bottle body 1 to connect with a lower end of the movable blocking arrangement 22. The movable blocking arrangement 22 comprises a nozzle 221 and a rotating switch 2210. An upper end of the nozzle 221 is communicated with a bottom portion of the silicone or rubber made flexible bowl member 21. The rotating switch 2210 is installed on the upper end of the nozzle 221. A lower end of the nozzle 221 is connected to an upper end of the supplying pipe 11 while a lower end of the supplying pipe 11 is disposed in the bottle body 1. According to the preferred embodiment, the silicone made flexible bowl member 21 is able to be selectively downfolded to a first decorative cover form (as shown in FIG. 1) covering an upper portion of the bottle body 1 or upfolded to extend upwards from the bottle lid 2 to a second liquid container form (as shown in FIG. 2). In the first decorative cover form, the flexible bowl member 21 forms a decorative cover, as shown in FIG. 1, by folding upside down the flexible bowl member 21 from the second liquid container form as shown in FIG. 2. In the second form, the flexible bowl member 21 forms a liquid container, as shown in FIG. 2, by up the flexible bowl member 21 in the decorative cover form as shown in FIG. 1. The rotating switch 2210 is arranged for selectively switching on to enable the liquid contained in the bottle body 1 to flow into the flexible bowl member 21 which is unfolded to form the liquid container or switching off to seal and block the liquid in the bottle body to flow into the flexible bowl member.

Figure 3:
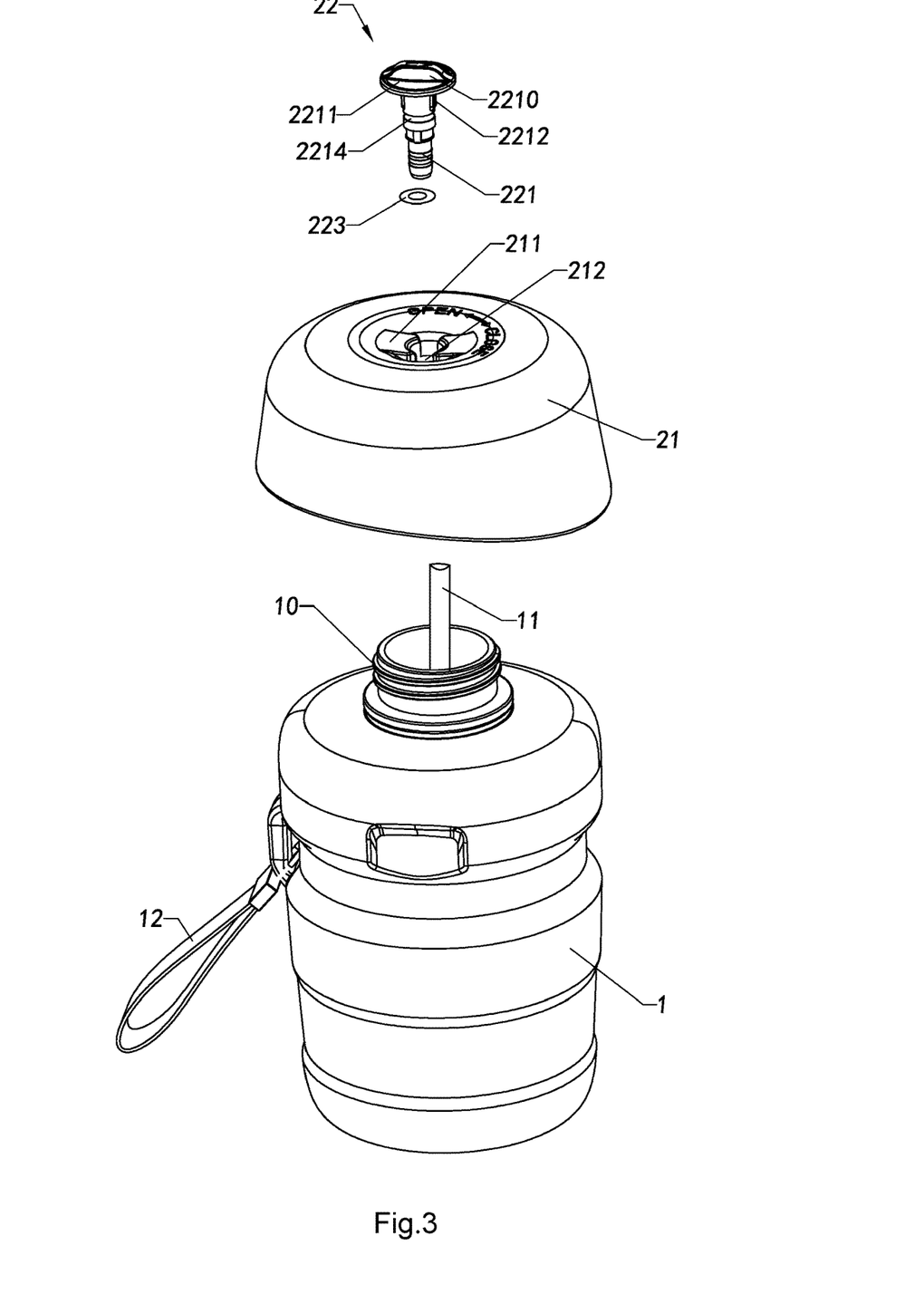
FIG. 3 is an exploded view of the portable bottle for pet according to the above preferred embodiment of the present invention.
Figure 4:
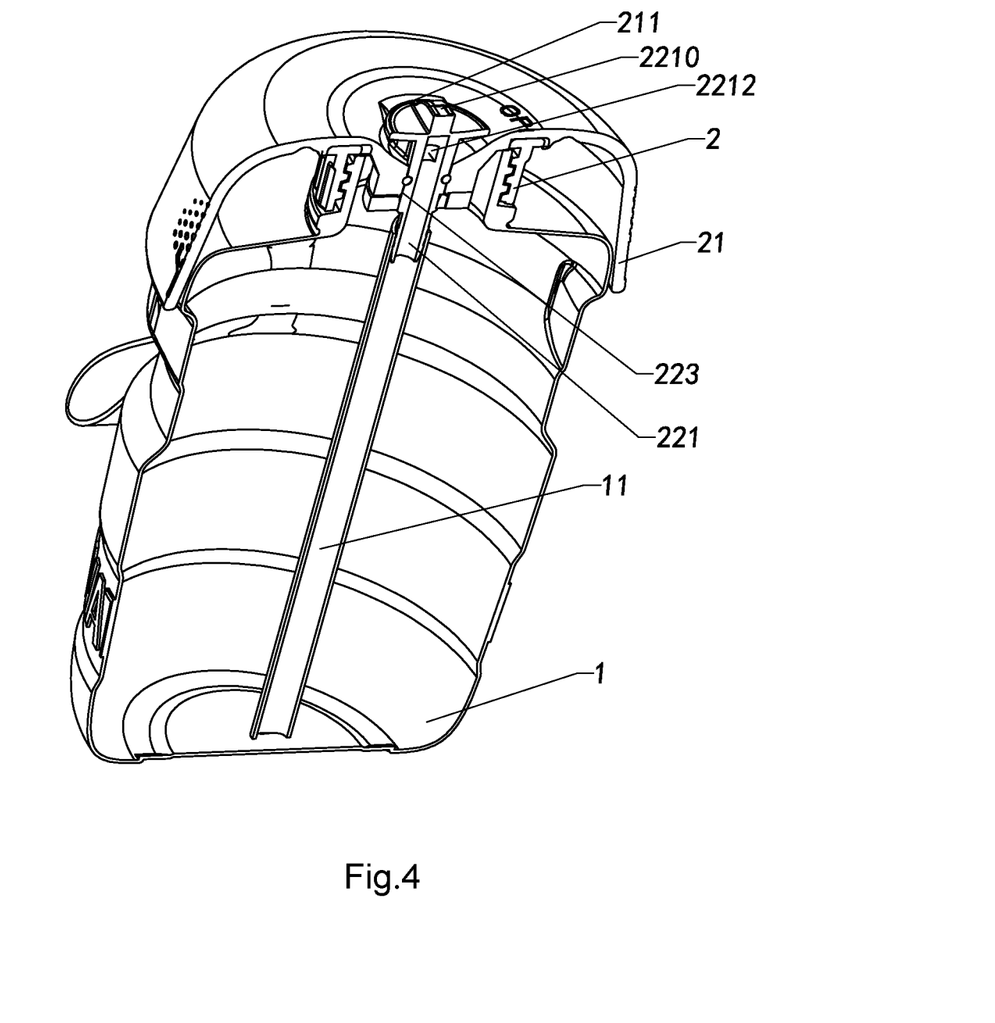
FIG. 4 is a sectional view of the portable bottle for pet according to the above preferred embodiment of the present invention.

In the above preferred embodiment, the upper end of the nozzle 221 passes through the bottom portion of the flexible bowl member 21. A top portion of the nozzle 221 comprises a blocking support 2211 and the rotating switch 2210 is provided on the blocking support 2211. A circumferential side of the upper end of the nozzle 221 has one or more outlets 2212. The one or more outlets 2212 are communicated with the supplying pipe 11. A bottom portion of the rotating switch 2210 has one or more blockers 2213 provided corresponding to the one or more outlets 2212 of the nozzle 221 respectively. The one or more blockers 2213 are arranged to be able to block the one or more outlets 2212 respectively. The bottle body 1 has an opening 10 facing the bottle lip 2. The rotating switch 2210 is configured to be pushed up by air pressure while squeezing the bottle body 1, wherein the one or more blockers 2213 are raised above the one or more outlets 2212 of the nozzle 221 to open the one or more outlets 2212 of the nozzle 221 for dispensing liquid from the bottle body 1 therethrough. The liquid in the bottle body 1 is able to flow out through the one or more outlets into the flexible rubber bowl 21 upfolded in the liquid container form for pet to drink. Releasing the bottle body 1, the remaining liquid in the flexible bowl member 21 flows into the supplying pipe 11 through the one or more outlets 2212 under air pressure. The rotating switch 2210 moves down because of gravity, and the one or more blockers 2213 fall back to under the one or more outlets 2212 of the nozzle 221 so as to block and seal the one or more outlets 2212 of the nozzle 221. A side of the bottom portion of the flexible bowl member 21, corresponding to the one or more outlets 2212 of the nozzle 221, comprises one or more step seals 211. Turning the rotating switch 2210 to align the one or more outlets 2212 of the nozzle 221 with the one or more step seals 211, the liquid stored in the bottle body 1 is sealed inside.

According to the above preferred embodiment, the movable blocking arrangement 22 further comprises a circular sealing ring 223, which is installed between the flexible bowl member 21 and the nozzle 221. The nozzle 221 has a circular mounting groove 2214 provided corresponding to the circular sealing ring 223. The mounting groove 2214 is located below the one or more outlets 2212 and the circular sealing ring 223 is mounted in the mounting groove 2214.

According to the preferred embodiment, the bottle body 1 is made of soft material. Preferably, the bottle body 1 is made of flexible plastic or flexible silicone. Therefore, the bottle body 1 is adapted to be easily deformed by being squeezed, and the deformed bottle body 1 will be remained in or reformed to its original shape under the air pressure when the bottle body 1 is not being squeezed or the squeezing of the bottle body 1 is released.

The advantages of the present invention are illustrated in the following:

As shown in FIG. 3 and FIG. 4, the portable bottle for pet has a good sealing ability for preventing liquid leaking out. The side of the bottom portion of the flexible bowl member 21, corresponding to the one or more outlets 2212 of the nozzle 221, comprises the one or more step seals 211, wherein when the pet does not need to use the portable bottle, the liquid/water stored in the bottle body 1 can be sealed in inside the bottle body 1 simply by aligning the one or more outlets 2212 of the nozzle 221 with the one or more step seals 211 through turning the rotating switch 2210 and the liquid in said bottle body 1 is sealed and prevented from leaking out the bottle body 1 during porting.

Figure 5A:
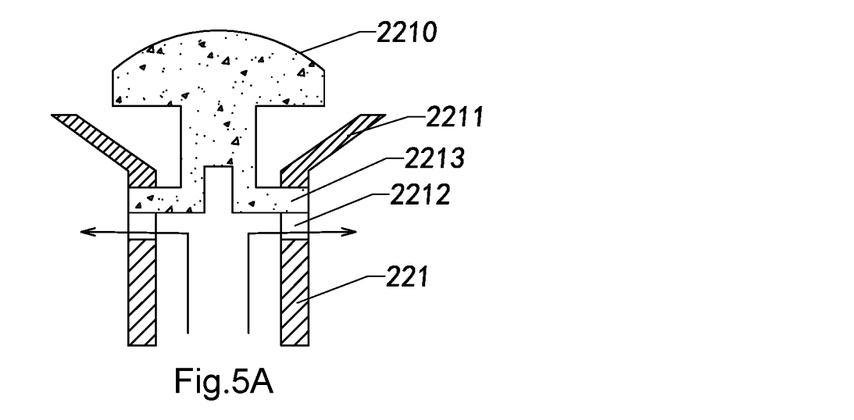
FIGS. 5A to 5C are a schematic views illustrating liquid flowing out and in according to the above preferred embodiment of the present invention.
Figure 5B:
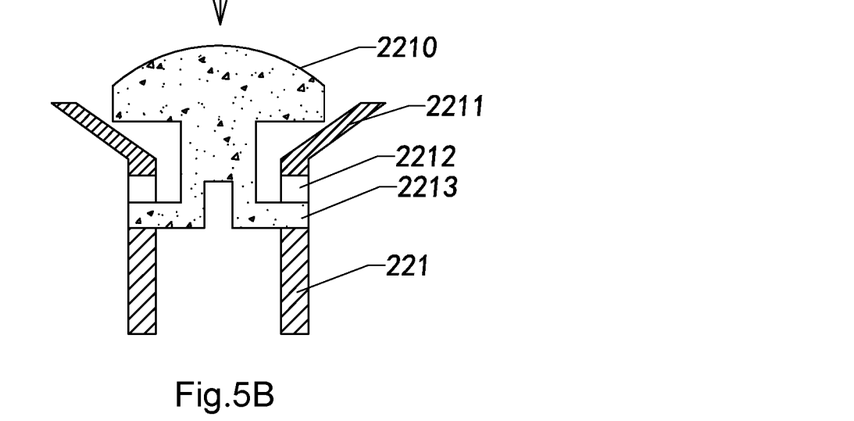

As shown in FIG. 5A and FIG. 5B, the bottle lid 2 of the portable bottle for pet of the present invention has a good liquid blocking. When the pet needs to drink water, all the outlets 2212 of the nozzle 221 are disaligned with the one or more step seals 211 by turning the rotating switch 2210 so that the one or more step seals 211 would not block the outlets 2212 of the nozzle 221. The rotating switch 2210 is pushed up by the air pressure in the bottle body 1 so that all the outlet 2212s of the nozzle 221 is opened to enable the liquid/water contained in the bottle body 1 to flow from the supplying pipe 11 into the flexible bowl member 21. Then, when the rotating switch 2210 is moved down under the weight of the liquid/water in the flexible bowl member 21 due to gravity, all the outlets 2212 of the nozzle 221 are blocked by the blockers 2213 so as to block the liquid/water in the flexible bowl member 21 from flowing back to the bottle body 1.

Figure 5C:
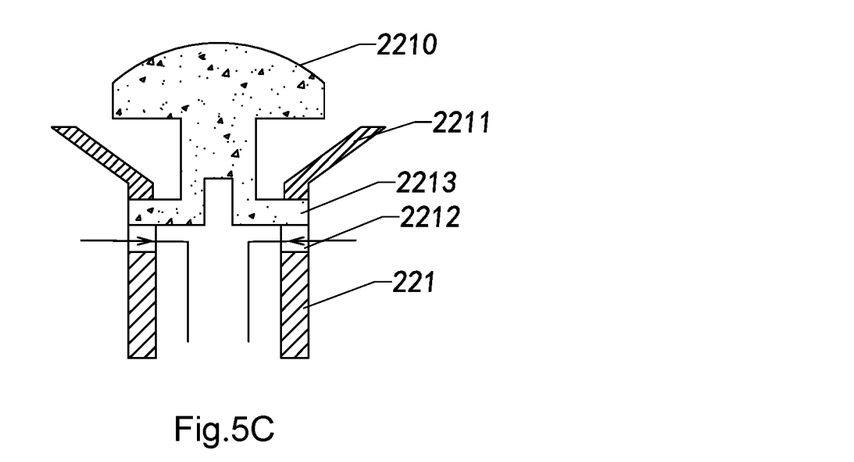

As shown in FIG. 5C, the portable bottle for pet of the present invention has a good ability of preventing the liquid/water in the flexible bowl member 21 from flowing back to the bottle body 1. After pet finished drinking, keep the opening 10 of the bottle body 1 upwards. Then, the rotating switch 2210 is pushed up by the air pressure and the outlets 2212 of the nozzle 221 are opened. Releasing the squeezing of the bottle body 1, the liquid/water remained in the flexible bowl member 21 will flow into the supplying pipe 11 and back to the bottle body 1 through the outlets 2212 by the air pressure. In such a manner, the water remained in the flexible bowl member 21 is able to flow back to the bottle body 1 so as to avoid waste of liquid/water.

The functions of the portable bottle for pet of the present invention integrates the bottle body 1 and the bowl member 21. The upfolded flexible bowl member 21 upwardly extended from the bottle lid 2 is capable of converting into a decorative cover by downfolding the flexible bowl member 21 for reducing the overall size of the portable bottle for pet of the present invention for ease of carrying and storage. A lanyard 12 can be connected to the bottle body 1 of the portable bottle for pet for conveniently carrying the portable bottle for pet.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable bottle for pet, comprising:
   a bottle body, made of flexible material adapted to be easily deformed by being squeezed, having an opening;
   a supplying pipe located in said bottle body;
   a bottle lid, having a lower end portion detachably connected to said bottle body and an upper end portion;
   a flexible bowl member, provided at said upper end portion of said bottle lid, having a bottom portion arranged in said opening of said bottle body and a liquid port at said bottom portion; and
   a movable blocking arrangement, having an upper end connected to said liquid port of said bottom portion of said flexible bowl member and a lower end connected to said supplying pipe located inside of said bottle body, wherein said movable blocking arrangement comprises a nozzle and a rotating switch, wherein said nozzle has an upper end and a lower end and comprises a blocking support at a top portion thereof, wherein said upper end of said nozzle has one or more outlets communicating with said supplying pipe and is arranged to communicate with a bottom portion of said flexible bowl member and pass through said bottom portion of said flexible bowl member, wherein said lower end of said nozzle is connected to an upper end of said supplying pipe, wherein said rotating switch is installed on said upper end of said nozzle and provided on said blocking support, wherein said rotating switch has one or more blockers provided at a bottom portion thereof corresponding to said one or more outlets of said nozzle respectively and is configured to be pushed up by air pressure while said bottle body being squeezing with a pressure such that said one or more blockers are raised above said one or more outlets of said nozzle to open said one or more outlets of said nozzle for dispensing a liquid in said bottle body therethrouqh, whereby the liquid in said bottle body is able to flow out through said one or more outlets into said flexible bowl member upfolded in said liquid container form until said rotating switch is moved down under a weight of the liquid in said flexible bowl member due to gravity to block said one or more outlets of said nozzle by said one or more blockers, and that while the pressure squeezing said bottle body is released, a remaining liquid in said flexible bowl member flows into said supplying pipe through said one or more outlets under air pressure and said rotating switch moves down due to gravity and said one or more blockers fall back to under said one or more outlets of said nozzle so as to block said one or more outlets of said nozzle.

2. The portable bottle for pet, as recited in claim 1, wherein said flexible bowl member is made of flexible material such that said flexible bowl member is able to be selectively downfolded to a first cover form covering an upper portion of said bottle body or upfolded to extend upwards from said bottle lid to a second liquid container form.

3. The portable bottle for pet, as recited in claim 1, wherein said one or more outlets are formed at a circumferential side of said upper end of said nozzle.

4. The portable bottle for pet, as recited in claim 2, wherein said one or more outlets are formed at a circumferential side of said upper end of said nozzle.

5. The portable bottle for pet, as recited in claim 1, wherein said flexible bowl member comprises one or more step seals provided at a side of said bottom portion thereof corresponding to said one or more outlets of said nozzle, wherein said one or more step seals are configured to align with said one or more outlets of said nozzle by turning said rotating switch such that the liquid stored in said bottle body is sealed inside, thereby when said one or more outlets of said nozzle are disaligned with said one or more step seals by turning said rotating switch so that said one or more step seals do not block said one or more outlets of said nozzle.

6. The portable bottle for pet, as recited in claim 2, wherein said flexible bowl member comprises one or more step seals provided at a side of said bottom portion thereof corresponding to said one or more outlets of said nozzle, wherein said one or more step seals are configured to align with said one or more outlets of said nozzle by turning said rotating switch such that the liquid stored in said bottle body is sealed inside, thereby when said one or more outlets of said nozzle are disaligned with said one or more step seals by turning said rotating switch so that said one or more step seals do not block said one or more outlets of said nozzle.

7. The portable bottle for pet, as recited in claim 3, wherein said flexible bowl member comprises one or more step seals provided at a side of said bottom portion thereof corresponding to said one or more outlets of said nozzle, wherein said one or more step seals are configured to align with said one or more outlets of said nozzle by turning said rotating switch such that the liquid stored in said bottle body is sealed inside, thereby when said one or more outlets of said nozzle are disaligned with said one or more step seals by turning said rotating switch so that said one or more step seals do not block said one or more outlets of said nozzle.

8. The portable bottle for pet, as recited in claim 4, wherein said flexible bowl member comprises one or more step seals provided at a side of said bottom portion thereof corresponding to said one or more outlets of said nozzle, wherein said one or more step seals are configured to align with said one or more outlets of said nozzle by turning said rotating switch such that the liquid stored in said bottle body is sealed inside, thereby when said one or more outlets of said nozzle are disaligned with said one or more step seals by turning said rotating switch so that said one or more step seals do not block said one or more outlets of said nozzle.

9. The portable bottle for pet, as recited in claim 1, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

10. The portable bottle for pet, as recited in claim 2, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

11. The portable bottle for pet, as recited in claim 3, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

12. The portable bottle for pet, as recited in claim 4, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

13. The portable bottle for pet, as recited in claim 5, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

14. The portable bottle for pet, as recited in claim 6, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

15. The portable bottle for pet, as recited in claim 7, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

16. The portable bottle for pet, as recited in claim 7, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

17. The portable bottle for pet, as recited in claim 8, wherein said movable blocking arrangement further comprises a circular sealing ring installed between said flexible bowl member and said nozzle, wherein said nozzle has a circular mounting groove provided corresponding to said circular sealing ring and located below said one or more outlets, wherein said circular sealing ring is mounted in said mounting groove.

18. The portable bottle for pet, as recited in claim 1, wherein said flexible material of said bottle body is selected from a group consisting of flexible plastic and silicone.

19. The portable bottle for pet, as recited in claim 2, wherein said flexible material of said bottle body is selected from a group consisting of flexible plastic and silicone.

\* \* \* \* \*